United States Patent
Hart

(10) Patent No.: US 10,962,588 B1
(45) Date of Patent: Mar. 30, 2021

(54) INTEGRATED CIRCUIT DEVICES AND METHODS OF DESIGNING AND PRODUCING INTEGRATED CIRCUITS

(71) Applicant: Xilinx, Inc., San Jose, CA (US)

(72) Inventor: Michael J. Hart, Palo Alto, CA (US)

(73) Assignee: XILINX, INC., San Jose, CA (US)

( * ) Notice: Subject to any disclaimer, the term of this patent is extended or adjusted under 35 U.S.C. 154(b) by 148 days.

(21) Appl. No.: 16/041,412

(22) Filed: Jul. 20, 2018

(51) Int. Cl.
*G01R 31/28* (2006.01)
*G06F 30/20* (2020.01)
*G06F 30/34* (2020.01)

(52) U.S. Cl.
CPC ......... *G01R 31/2877* (2013.01); *G06F 30/20* (2020.01); *G06F 30/34* (2020.01)

(58) Field of Classification Search
CPC ...... G01R 31/2877; G06F 30/20; G06F 30/34
USPC ..................................... 324/750.03
See application file for complete search history.

(56) References Cited

U.S. PATENT DOCUMENTS

| | | | |
|---|---|---|---|
| 6,847,019 B2 | 1/2005 | Yokozeki et al. | |
| 6,978,541 B1 | 12/2005 | Feltner et al. | |
| 6,993,737 B1 | 1/2006 | Anderson et al. | |
| 7,257,511 B1 | 8/2007 | Hsieh et al. | |
| 8,299,590 B2 | 10/2012 | Rahman | |
| 2015/0194273 A1* | 7/2015 | Jarvelainen | H01G 11/10 180/54.1 |

* cited by examiner

*Primary Examiner* — Farhana A Hoque
(74) *Attorney, Agent, or Firm* — Patterson + Sheridan, LLP

(57) ABSTRACT

A device comprising a plurality of transistors; interconnect elements coupled to the plurality of transistors is described. The interconnect elements enable the transfer of signals between the plurality of transistors. The device further includes a cooling element associated with the device, wherein the cooling element is configured to maintain a temperature of a circuit having the plurality of transistors and interconnect elements below a predetermined temperature; wherein one or more parameters of the device is optimized to operate at a temperature below the predetermined temperature. A method of implementing a circuit is also described.

20 Claims, 4 Drawing Sheets

INTEGRATED CIRCUIT DEVICES AND METHODS OF DESIGNING AND PRODUCING INTEGRATED CIRCUITS

TECHNICAL FIELD

The present invention relates generally to integrated circuit devices, and in particular to methods of designing and producing an integrated circuit device.

BACKGROUND

Current integrated circuit (IC) technology and product specifications are based around a maximum product or die temperature of typically 85° C. for Commercial ICs, 100° C. for Industrial/Automotive ICs, or 125° C. for Military ICs. Many aspects of product design and optimization are based around these temperatures.

The design of transistor elements, including the channel, source, drain, and gate for example, is based upon to this maximum temperature. The electrical parameters that can be selected during the design of a transistor include for example a minimum gate length, a threshold voltage, an on-current (Idsat), and an off-current (Ioff). In addition, reliability limits lead to specific choices of doping profiles, materials choices, and other structures of an IC. Device degradations over product lifetime also occur, including biased temperature instability (BTI) drifts, hot-carrier degradations, and dielectric time-dependent dielectric breakdown (TDDB) wear-out.

During product design, simulation of transistor characteristics, metal resistance-capacitance (RC) values, and allowance for lifetime degradations should be accounted for. In typical semiconductor products, many of these parameters have their worst values at high temperature, and the common specifications for maximum temperatures (e.g. 85° C., 100° C. or 125° C.) place specific constraints on the technology optimization and on the product design and specification.

Accordingly, there is a need for a method of designing an integrated circuit device that improves the operation of the integrated circuit device at a lower temperature.

SUMMARY

A device comprising a plurality of transistors; interconnect elements coupled to the plurality of transistors is described. The interconnect elements enable the transfer of signals between the plurality of transistors. The device further includes a cooling element associated with the device, wherein the cooling element is configured to maintain a temperature of a circuit having the plurality of transistors and interconnect elements below a predetermined temperature; wherein one or more parameters of the device is optimized to operate at a temperature below the predetermined temperature.

A method of implementing a device is also described. The method comprises identifying a predetermined temperature for operating a circuit of the device; selecting a cooling element for maintaining the circuit at a temperature below the predetermined temperature; optimizing one or more parameters of the device to operate at the temperature below a predetermined temperature; and coupling interconnect elements to a plurality of transistors to enable the transfer of signals between the plurality of transistors.

DETAILED DESCRIPTION

The integrated circuit devices and methods are directed to the design and optimization of integrated circuit products, including packaged integrated circuit devices or a circuit board having integrated circuit devices, for a reduced maximum operating temperature. By controlling the maximum temperature of the integrated circuit device to a predetermined temperature lower than a maximum value (i.e. a temperature at which a device is designed to operate in a conventional device, such as 85° C., 100° C. and 100° C.), the integrated circuit devices can operate with many favorable attributes. For example, improved or desired operation of the integrated circuit device, such as for power (dynamic or static) or performance (transistor performance or interconnect performance), can be achieved by designing transistors to lower threshold voltages, enable higher Idsat values, which is a commonly used term for transistor drain current in saturation mode (where Vdrain=Vgate=High=Vdd, Vsource=Low=0V for an NMOS device for example), or select desired gate lengths. Other design selections, including the selection of doping profiles and material choices, such as the thickness of interconnect elements or the selection of dielectric materials can also provide improved operation and a reduction of device degradations.

To achieve a temperature lower than a maximum temperature, advanced cooling systems may be adopted. These advanced cooling systems may include die liquid cooling, such as through die cooling or jest spray cooling, or immersion in liquid nitrogen for example. With such approaches, a maximum device temperature may be controlled to the new lower optimized temperature. The PPAC (Performance, Power, Area & Cost) benefits of these new products can outweigh any additional cost of the required advanced cooling solutions.

While the specification includes claims defining the features of one or more implementations of the invention that are regarded as novel, it is believed that the circuits and methods will be better understood from a consideration of the description in conjunction with the drawings. While various circuits and methods are disclosed, it is to be understood that the circuits and methods are merely exemplary of the inventive arrangements, which can be embodied in various forms. Therefore, specific structural and functional details disclosed within this specification are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting, but rather to provide an understandable description of the circuits and methods.

Figure 1:
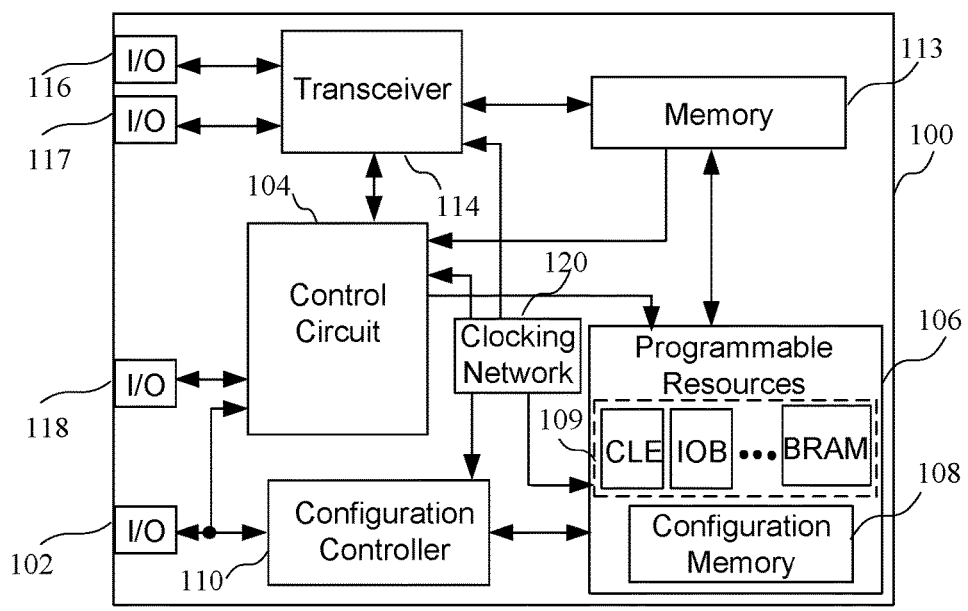
FIG. 1 is a block diagram of an integrated circuit device having transistors and interconnect elements.

Turning first to FIG. 1, a block diagram of an integrated circuit device 100 having circuit elements, such as transistors and interconnect elements. In particular, an input/output port 102 is coupled to a control circuit 104 that controls programmable resources 106 having configurable logic elements (CLEs) 109 and other programmable resources, such as input/output blocks (IOBs) and blocks of random access memory (BRAMs). Configuration data may be provided to the configuration memory 108 by a configuration controller 110. The configuration data enables the operation of the programmable resources 106. A memory 113 may be coupled to the control circuit 104 and the programmable resources 106. A transceiver circuit 114, which comprises a transmitter and a receiver, may be coupled to the control circuit 104, programmable resources 106 and the memory 113, and may receive signals at the integrated circuit by way of I/O ports 116 and 117. Other I/O ports may be coupled to circuits of the integrated circuit device, such as I/O port 118 that is coupled to the control circuit 104 as shown. A clocking network 120 is coupled to various elements of the circuit of FIG. 1. The integrated circuit device 100 comprises transistor devices and other circuit element such as interconnect elements, also known as metal traces, that can be designed for improved or optimized performance at reduced temperatures, as will be described in more detail below.

Figure 2:
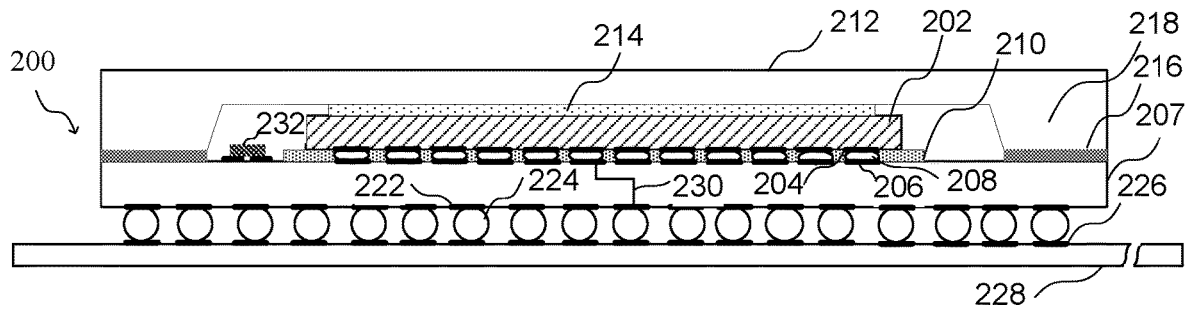
FIG. 2 is a cross-sectional view of an integrated circuit device of FIG. 1 and showing a cooling element.

Turning now to FIG. 2, a cross-sectional view of an integrated circuit device having a cooling element is shown. More particularly, the integrated circuit device 200 comprises a die 202 having a plurality of contact elements 204 adapted to make an electrical connection to a plurality of corresponding contact elements 206 of a substrate 207 by way of contact elements 208, which may comprise solder bumps for example. A dielectric material 210, such as a resin, may be included between the die 202 and the substrate 207. A lid 212 may be used to encapsulate the die 202, where an adhesive material 214 may be used to secure the lid to the die, and direct heat to the lid 212 to reduce the operating temperature of the die 202. An adhesive material 216 may also be positioned between a foot portion 218 of the lid 212 and the substrate 207.

The integrated circuit device 200 of FIG. 2 also comprises connection elements associated with the substrate 207 to enable connections external to the integrated circuit device. More particularly, contact elements 222 on the bottom of the substrate 207 enable connections by the way of contact elements 224, shown here by way of example as solder balls, to corresponding contact elements 226 on a circuit board 228. Interconnect elements enable connections between the contact elements 206 and the contact elements 222. Finally, a cooling element 232 could be included in the integrated circuit device to keep the die at a predetermined temperature or within a predetermined temperature range to enable improving or maximizing operation of the integrated circuit device below a predetermined temperature. The predetermined temperature may be any temperature that is lower than a maximum temperature at which an integrated circuit device may normally be designed to operate at, such as 85° C. for Commercial ICs, 100° C. for Industrial/Automotive ICs, or 125° C. for Military ICs. The predetermined temperature may be a specific temperature or a temperature range, and may represent a temperature of a circuit operating in the integrated circuit device. For example, the temperature of the circuit may be determined by the temperature of the die, which may be determined by a temperature detection circuit implemented in the integrated circuit device, such as by using a circuit of the die. However, it should be understood that the temperature of the circuit may be determined based upon a detected temperature at other locations of the integrated circuit device. According to some implementations, the predetermined temperature may be an ambient temperature associated with the environment in which the integrated circuit is operating, where the die of the integrated circuit device would be kept below an ambient temperature. In other implementations, the predetermined temperature may be as low as 0° C. The cooling element 232 could be for example an active cooling element, such as a jet cooling system that sprays a liquid coolant on the die within a packaged integrated circuit device or closed-loop refrigeration system for example. While an integrated circuit device with a lid is shown, it should be understood that the cooling of die in integrated circuit devices not having lids can also be achieved, as will be described in more detail below.

Figure 3:
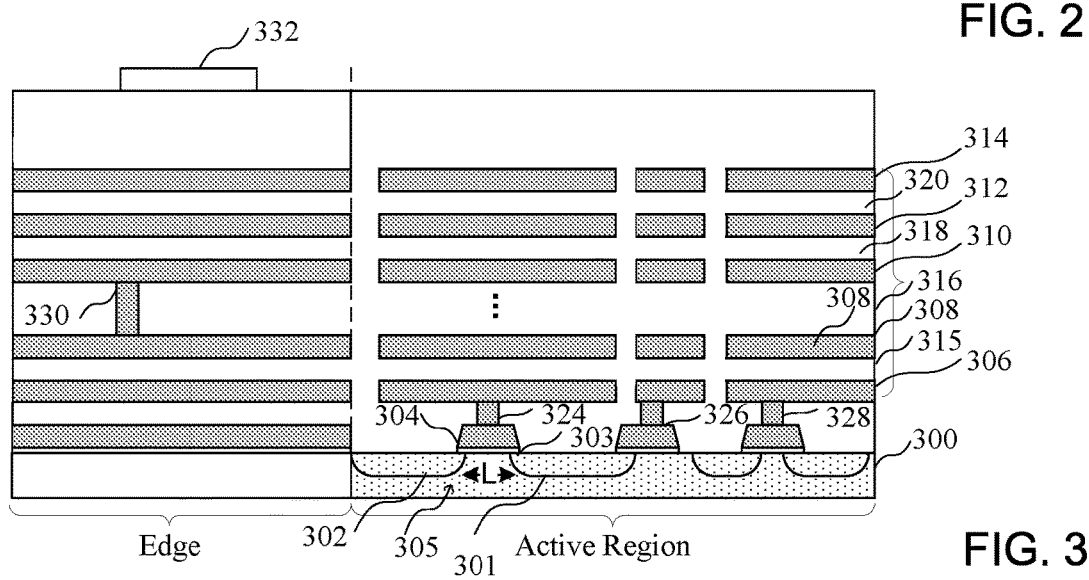
FIG. 3 is a cross-sectional view of the integrated circuit die of FIG. 2 showing a transistor and interconnect elements of the integrated circuit die.

Turning now to FIG. 3, a cross-sectional view of the integrated circuit die, such as the die 202 of FIG. 2, is shown. As can be seen in FIG. 3, the region 300 of the substrate comprises active devices (e.g. transistors) formed in the substrate, such as wells or other diffusion or implant regions of the active devices. A portion of a diffusion region 301 and a diffusion region 302, which may form a source and drain of a transistor for example, is covered by a dielectric layer 303 and a polysilicon layer 304 which are etched to form a gate (having a gate length L between the source and drain of the transistor) of a transistor 305. Although a single transistor 305 is shown by way of example, it should be understood that many transistors would be implemented in the integrated circuit device. Whereas one type of transistor is shown here corresponding to a traditional "planar" metal-oxide-semiconductor field-effect transistor (MOSFET), the circuits and methods can equally apply to other types of transistors, such as Fin Field Effect transistors (FinFETs) and Gate-All-Around (GAA) or nanowire MOSFETs. Alternating metal and dielectric layers above the gate enable the formation of interconnect elements between a node of a circuit implemented in the integrated circuit device and an element of the substrate, such as a gate of the transistor. In particular, metal layers 306-314 are separated by corresponding dielectric layers 315-320 to enable the formation of the interconnects using vias, such as vias 324-330. The metal layers and vias may comprise copper or some other suitable conductive material, while the dielectric may comprise fluorinated spin-on glass (FSG), or some other suitable material having a low dielectric constant. A contact pad 332 may be aluminum, or some other suitable conducting material. The number of metal layers required to implement the necessary interconnects of the integrated circuit may vary depending upon the complexity of the circuit. As will be described in more detail below, various characteristics (e.g. materials, dimensions, etc.) of the transistor, interconnect elements or other elements of the integrated circuit device can be selected to improve or maximize the operation of the transistors of the integrated circuit device.

There are a number of factors that may be considered when selecting dimension of elements of an integrated circuit device, materials of the elements, and voltages during operation of the integrated circuit device while designing an integrated circuit device. The selection of dimensions and materials of the integrated circuit device can provide reduced power or increased performance, where the selections for reduced power or increased performance may lead to design tradeoffs. Some of the factors may affect transistor performance. For example, the transistors may be implemented with smaller dimensions (i.e. a smaller gate length) than devices designed to operate at a maximum operating temperature, such as 85° C., 100° C. or 125° C., and thinner dielectric materials than used at maximum operating temperatures which provide improved channel control, Idsat and switching speed. In general, lower dielectric constant (k) materials would give a lower capacitance, and hence performance and power advantages. While lower k materials also have weaker mechanical strength, and may not have adequate reliability at the conventional (i.e. higher) specification temperatures, they may be adequate for the lower temperatures. Lower threshold voltages ($V_T$) provide improved transistor performance, with higher Idsat and transistor switching speed. Higher supply voltages (e.g. Vdd=Vdrain=Vgate) applied to transistors also provide improved transistor performance. The selection of interconnect elements can also affect performance, where smaller dimensions of the metal layers for interconnect elements and thinner dielectrics provide improved channel control, Idsat and switching speed.

The selection of one or more design elements of an integrated circuit (e.g. transistor and interconnect element dimensions, materials and voltages) may also affect dynamic power, where a smaller capacitance is better for some interconnect parasitics, and can be achieved by smaller metal track lengths and thinner barrier materials, which may be dielectric materials. A lower resistance of interconnect elements also improves (i.e. reduces) dynamic power. The lower resistance can be achieved based upon the selection of materials and reduced thickness and lengths of the interconnect elements. However, in considering static power, higher threshold voltages, longer transistor gate lengths and thicker dielectric materials provide improved static power performance. While a designer may desire to optimize a particular property of an integrated circuit (e.g. power or performance), and the selection of one or more design elements to optimize one property (e.g. power) may adversely affect a different property (e.g. performance), the selection of the design elements to be optimized at a lower temperature will improve the operation of the integrated circuit device with respect to the selected property when the integrated circuit is operated at the lower temperature. That is, improved operation of the integrated circuit device will be achieved by selecting design elements that are intended to improve or optimize a certain property, where selecting the design element to operate at the reduced temperature will provide improved operation compared to an operation when the integrated circuit device is designed to meet a maximum operating temperature (e.g. 85° C. for Commercial ICs, 100° C. for Industrial/Automotive ICs, or 125° C. for Military ICs).

While the choice of design factors for conventional integrated circuit devices may also be based on reliability requirements, such as the need to meet a specific lifetime specification at a maximum operating temperature (e.g. 10 Years for an integrated circuit device adapted to operate at 100° C. or 3 years for an integrated circuit device operation at 125° C.) for a given operating reference voltage (e.g. Vcc) level, these requirements are easily met when designing an integrated circuit device to operate at a reduced temperature (i.e. below 85° C. for Commercial ICs, 100° C. for Industrial/Automotive ICs, or 125° C. for Military ICs). Unlike conventional devices that set a maximum for voltages, a minimum for dimensions, thicknesses, threshold voltages, metal thicknesses, and via sizes for example, and sets a requirement for materials choices (e.g. better than a certain specification), tradeoffs can be made in selecting dimensions, material or voltages to optimize transistor performance, interconnect performance, dynamic power, or static power, where selected values for dimensions of transistors or interconnect elements may be selected to optimize a characteristic or operation of an integrated circuit device at a predetermined temperature, which may be reduced temperature or range of temperatures. According to some implementations, the predetermined temperature may be an ambient temperature associated with an environment in which the integrated circuit is operating. According to other implementations, the predetermined temperature may be a low temperature, such as 0° C. The predetermined temperature may be a temperature of the die, as determined based upon the detection of the temperature of the die using a circuit on the die. Other improvements to integrated circuit devices that can be achieved through designing the integrated circuit device to be optimized at a reduced temperature is that the integrated circuit device can be smaller and therefore have a reduced cost to produce.

When optimizing improvements to transistor performance, an approximate 10-20 percent reduction in gate length could be achieved, 10-20 percent thinner gate dielectrics could be achieved, and lower threshold voltages of approximately 100-200 mV could be achieved by operating at a reduced temperature. It should be noted that a shorter gate length for a transistor can cause increased leakage, worsens the transistor channel control, increases short channel effects (SCE), including effects such as drain induced barrier lowering (DIBL) in the off state of a transistor (i.e. Vdrain=Vdd and Vgate=0V for an NMOS transistor). Reducing the operating temperature of the integrated circuit device significantly improves the SCE and reduces the leakage, where transistor leakage can be 50 times lower in some cases when operating at lower temperatures. Therefore, the combination of the reduced temperature and the reduced gate length can provide adequate channel control and low leakage, where the reduced gate length provides other improvements, such as reduced size and cost of the integrated circuit. While percentage values associated with improvements or reductions are provided by way of example, it should be understood that these percentages may vary depending upon design tradeoffs and properties that are intended to be improved or optimized when operating at a reduced temperature.

When optimizing improvements to interconnect performance (which may be based upon resistance or capacitance parasitics for example), it should be noted that metal lines and vias exhibit lower resistance at lower temperatures, where up to 10 times lower resistance may be achieved. For example, metal resistance can be 1 order of magnitude lower at −40° C. versus 125° C. Electromigration is significantly improved at low temperatures, and may be up to 10 times lower with improved interconnect performance. Improvements in transistor performance and interconnect performance can allow thinner and narrower metal lines, fewer vias and hence area reduction. Area reduction in turn reduces line lengths and further improves transistor performance and lowers capacitance and dynamic power.

When improving or optimizing an integrated circuit device for dynamic power reduction, gate lengths can be reduced by 10-20 percent at lower operating temperatures. Further, lower dielectric constant dielectric materials, which may generally be weaker in terms of reliability, having K values as low as 2.0 or even air gaps can provide adequate electrical and mechanical reliability at lower temperatures.

The metal and via parasitic capacitances are also reduced when optimizing the circuit for dynamic power reduction.

When optimizing an integrated circuit device for static power, lower threshold voltages are possible as leakage is strongly temperature dependent, which may lead to higher performance of transistors of approximately 10-20 percent. It should be noted that reducing the threshold voltage ($V_T$) reduces static power. When the threshold voltage is reduced, the gate drive is increased to enable the transistor to turn on faster, which leads to higher Idsat. Therefore, higher performance (e.g. higher Idsat) results in faster switching speed and reduced delays, where the improvement in the static operation also leads to improvements in the dynamic operation.

Designing integrated circuit devices to operate at lower temperatures also improves reliability aspects of operating the integrated circuit devices. For example, degradation effects on transistors, such as oxide wear-out, is less at low temperatures. It also allows use of lesser implants to control leakage and channel performance, where lower doping levels of implants can increase carrier mobility and hence increase performance of transistors. Also, transistors can then operate at higher voltages at reduced temperatures, which boosts performance. Significant area reduction, which may be approximately 10-30 percent, and cost reduction of approximately 10-40 percent which follows as a result of the area reduction, may be possible.

The improvements to transistors can provide improvements in Programmable Logic Devices (PLDs), such as Field Programmable Gate Arrays. For example, pass transistor threshold voltages and gate lengths can be reduced to achieve higher performance, including in programmable interconnect multiplexers and drivers. Programmable interconnect metal tracks, which are implemented widely in PLDs, can be made narrower, thinner and shorter, leading to lower parasitic capacitance and resistance and therefore provide higher performance. Therefore, an operating reference voltage can be increased, and area and cost can be reduced.

Figure 4:
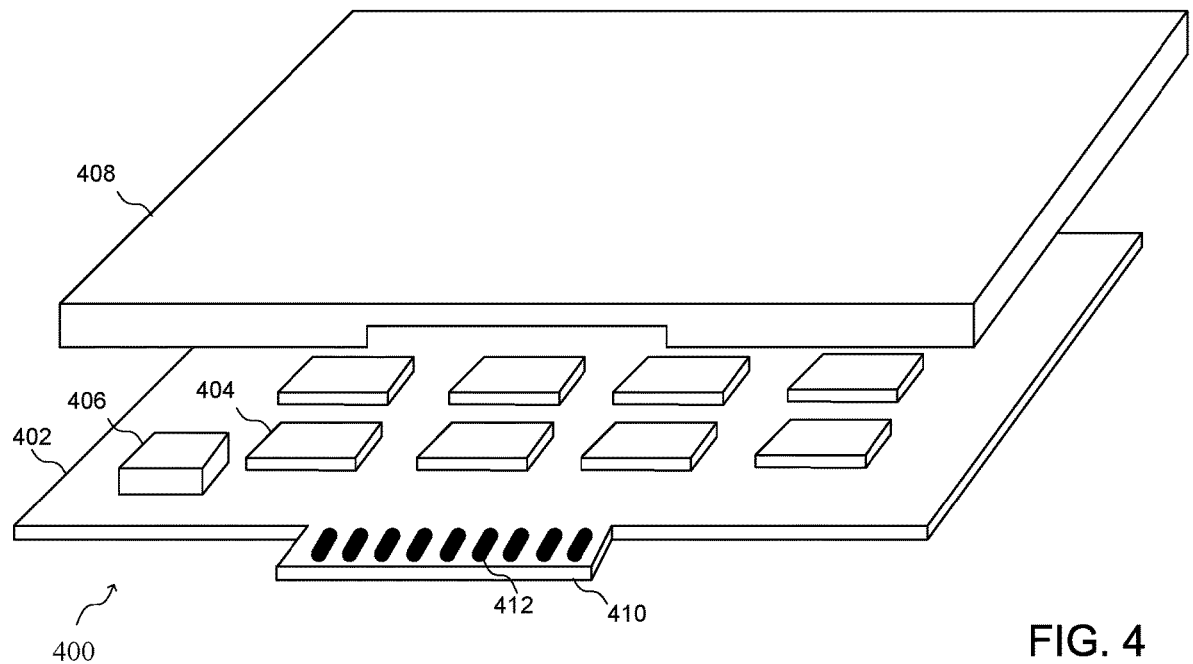
FIG. 4 is a plan view of a circuit board having a cooling element for a plurality of integrated circuit devices.

While FIG. 2 describes an individual integrated circuit, the methods of designing and producing integrated circuit can relate to integrated circuits that may be implemented on circuit boards, where the cooling element is provided on the circuit board or on a device that is intended to retain one or more of the circuit boards. As shown in FIG. 4, a plan view of a circuit board having a cooling element is shown. The circuit board arrangement 400 comprises a circuit board 402 having a plurality of integrated circuit devices 404, which may have transistors and interconnect elements having dimensions that are selected so that the integrated circuit device is optimized at a reduced temperature. Unlike FIG. 3 where the integrated circuit devices have lids, the circuit board 402 may also comprise a cooling element 406 and a lid 408, where the integrated circuit devices 404 may be lidless, and the exposed die are cooled by the cooling element 406. The cooling element 406 may operate in a similar manner as the cooling element 232 of FIG. 2, for example, but enables a temperature reduction for multiple integrated circuit devices. That is, the lid 408 is attached to the circuit board 402 to enable the temperature of the integrated circuit devices 404 to be maintained at a predetermined reduced temperature. The circuit board also comprises a connector 410 having contact elements 412 enabling an electrical connection to an external device. According to some implementations, the temperature of the integrated circuit devices 404 may be a temperature below ambient for example.

Figure 5:
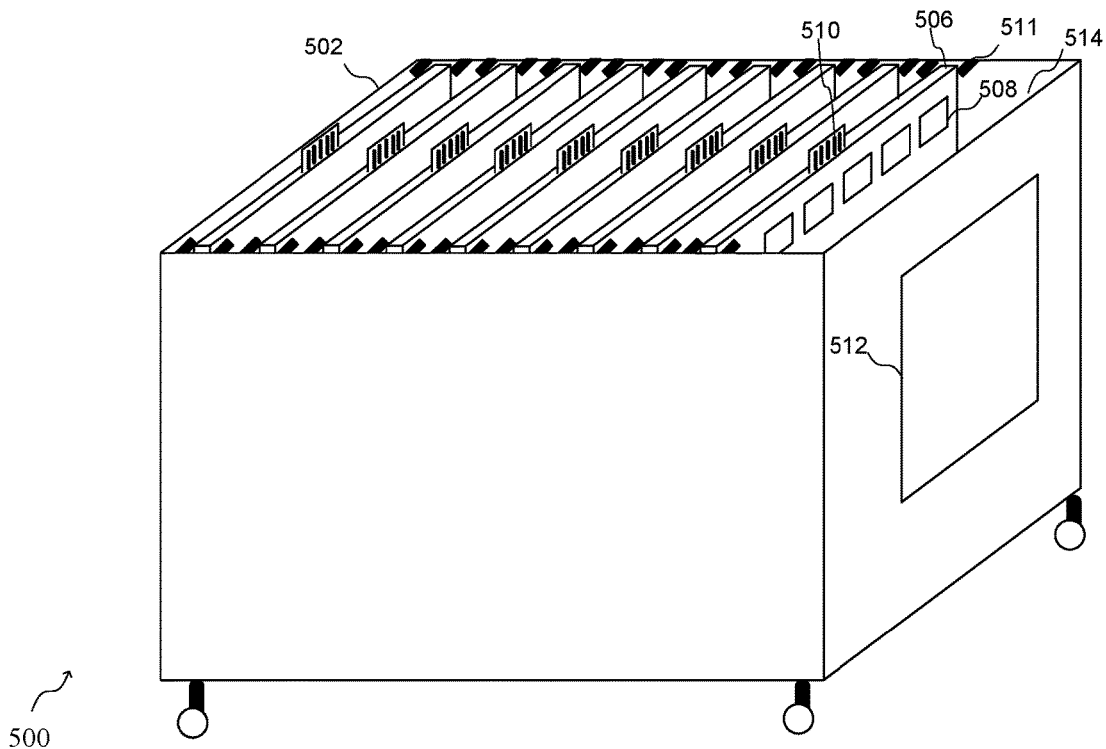
FIG. 5 is a plan view of a cooling system for maintaining the temperature of integrated circuit die below a predetermined temperature.

Turning now to FIG. 5, a plan view of a cooling system 500 for maintaining the temperature of integrated circuit die at a predetermined reduced temperature is shown. According to implementations as shown by way of example in FIG. 5, the die of the integrated circuit devices also remain exposed (i.e. the integrated circuit devices do not have a lid), and cooled to a predetermined reduced temperature. The cooling system 500 comprises a container 502 for retaining a plurality of circuit boards 506 having integrated circuit devices 508, shown here by way of example as a rack for a plurality of circuit boards. Each circuit board 506 may be retained in the container by retaining elements 511 and may have an exposed connector element 510 to enable a connection to a corresponding connector for input and output to the circuit boards. A cooling element 512 may be fan enabling an air cooling of the integrated circuit devices 508 to a predetermined temperature. According to another implementation, the container may be an immersion cooling system and may be filled with an immersion element 514, such as a liquid or gaseous cooling element. A temperature associated with a circuit of an integrated circuit of the circuits boards of FIGS. 4 and 5 may be determined based upon a temperature of one or more integrated circuit devices on the circuit board, or a temperature detected by another element on the circuit board, such as by the cooling element 406 or a separate temperature sensor implemented on the circuit board.

Figure 6:
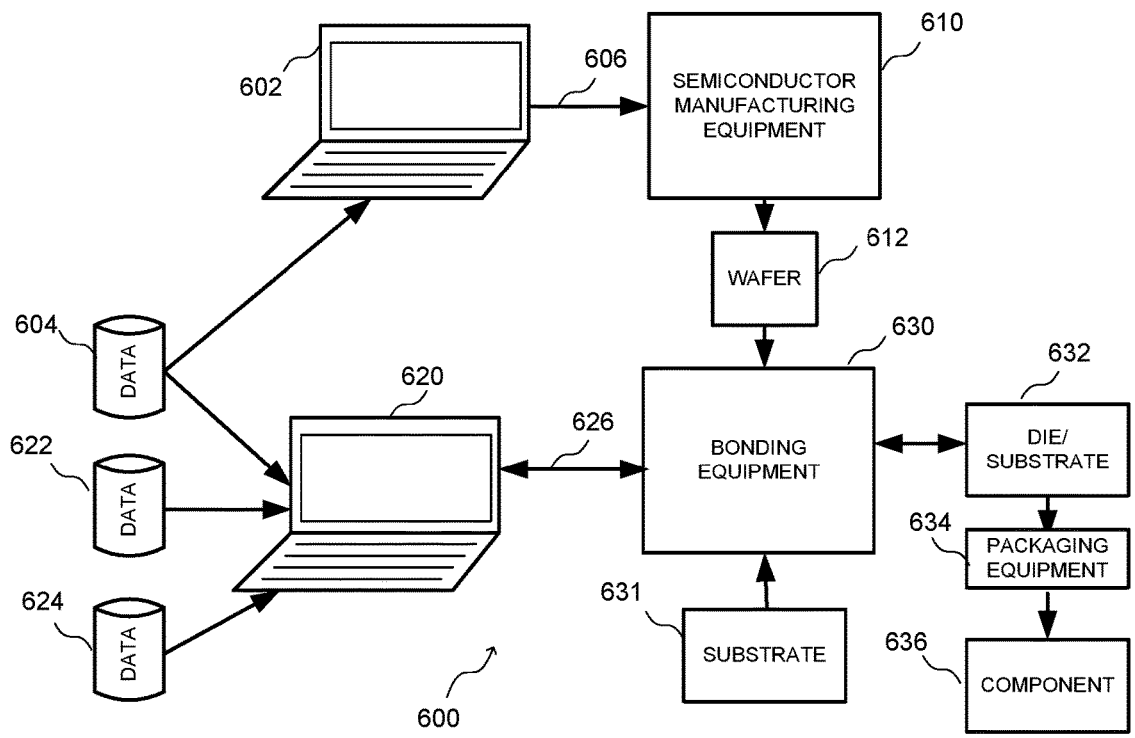
FIG. 6 is a block diagram of a system for designing and producing an integrated circuit device.

Turning now to FIG. 6, a block diagram of a system for designing and producing an integrated circuit device is shown. The system 600 comprises computer-aided design (CAD) equipment 602, which could be any computer adapted to run CAD software. The CAD equipment 602 receives data, such as a master schematic 604 based upon selected values for transistor and interconnect element design, and is coupled by a communication link 606 to semiconductor manufacturing equipment 610. CAD equipment 602 could be used to simulate and determine desired transistor and interconnect element values that improve or maximize performance at a reduced temperature. The semiconductor manufacturing equipment 610 may generate a wafer 612 having a plurality of die, as is well known in the art.

CAD equipment 620, which is also coupled to receive the master schematic 604, receives a bonding diagram 622 and substrate artwork 624. The CAD equipment 620 is coupled by a communication link 626 to bonding equipment 630. The communication links 606 and 626 could be any wired or wireless communication link. The bonding equipment generally provides wire bonds from a die from the wafer 612 to a substrate 631 receiving the die, as will be described in more detail in reference to other figures. The die/substrate 632 is coupled to packaging equipment 634 which generates a finished component 636, such as an integrated circuit package. The system of FIG. 6 enables the manufacture of an integrated circuit package according to the various circuits and methods set forth above. Although the system of FIG. 6 provides various elements required for producing an integrated circuit package, it should be understood the elements shown in FIG. 6 could be combined, or additional elements could be provided.

Figure 7:
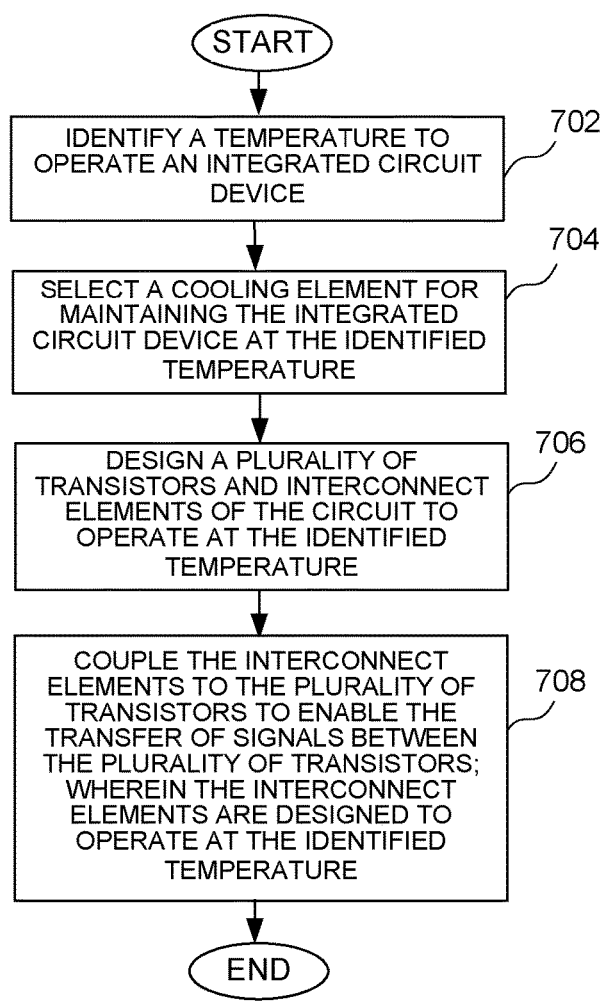
FIG. 7 is a flow chart showing a method of designing and producing an integrated circuit device.

Turning now to FIG. 7, a flow chart shows a method of designing and producing an integrated circuit device. A temperature for operating the integrated circuit device, such as the temperature of a die of the integrated circuit device, is identified at a block 702. The temperature may be a specific temperature or a range of temperatures. The temperature could be any temperature below a maximum temperature at which a device is designed to operate, such as 85°

C. for Commercial ICs, 100° C. for Industrial/Automotive ICs, or 125° C. for Military ICs, or could be at or below an ambient temperature. A cooling element, which may be an active cooling element as described above, is selected for maintaining the circuit at the identified temperature at a block 704. The cooling element may be implemented on an integrated circuit device, on a circuit board having the integrated circuit device, or on a system to retain one or more integrated circuit devices or circuit boards. A plurality of transistors of the circuit is designed to operate at the identified temperature at a block 706. Interconnect elements are coupled to the plurality of transistors to enable the transfer of signals between the plurality of transistors at a block 708, wherein the interconnect elements may also be designed to operate at the identified temperature and improve or optimize the operation of the integrated circuit device. The integrated circuit devices adapted to operate at a reduced temperature are then produced.

According to some implementations, the active cooling element may be selected from a group consisting of an air cooling system, an immersion cooling system, a jet cooling system, and a closed-loop refrigerant system. Designing the plurality of transistors and the interconnect elements may comprises designing the plurality of transistors and the interconnect elements to be optimized for power or performance. Alternatively, designing the plurality of transistors may comprise designing the plurality of transistors for performance improvements to have predetermined transistor gate lengths, dielectric materials and threshold voltages. Designing the plurality of transistors may comprise designing the plurality of transistors for power improvements to have predetermined gate lengths, dielectric materials, and threshold voltages. Designing the interconnect elements to operate at the identified temperature may comprise designing the interconnect elements to have certain thicknesses and other dimensions of metal layers, and comprise lower resistance materials. The integrated circuit devices can be designed with transistors and interconnect elements to improve or optimize the performance of the integrated circuit device according to the design criteria for the transistors or interconnect elements as set for above.

Figure 8:
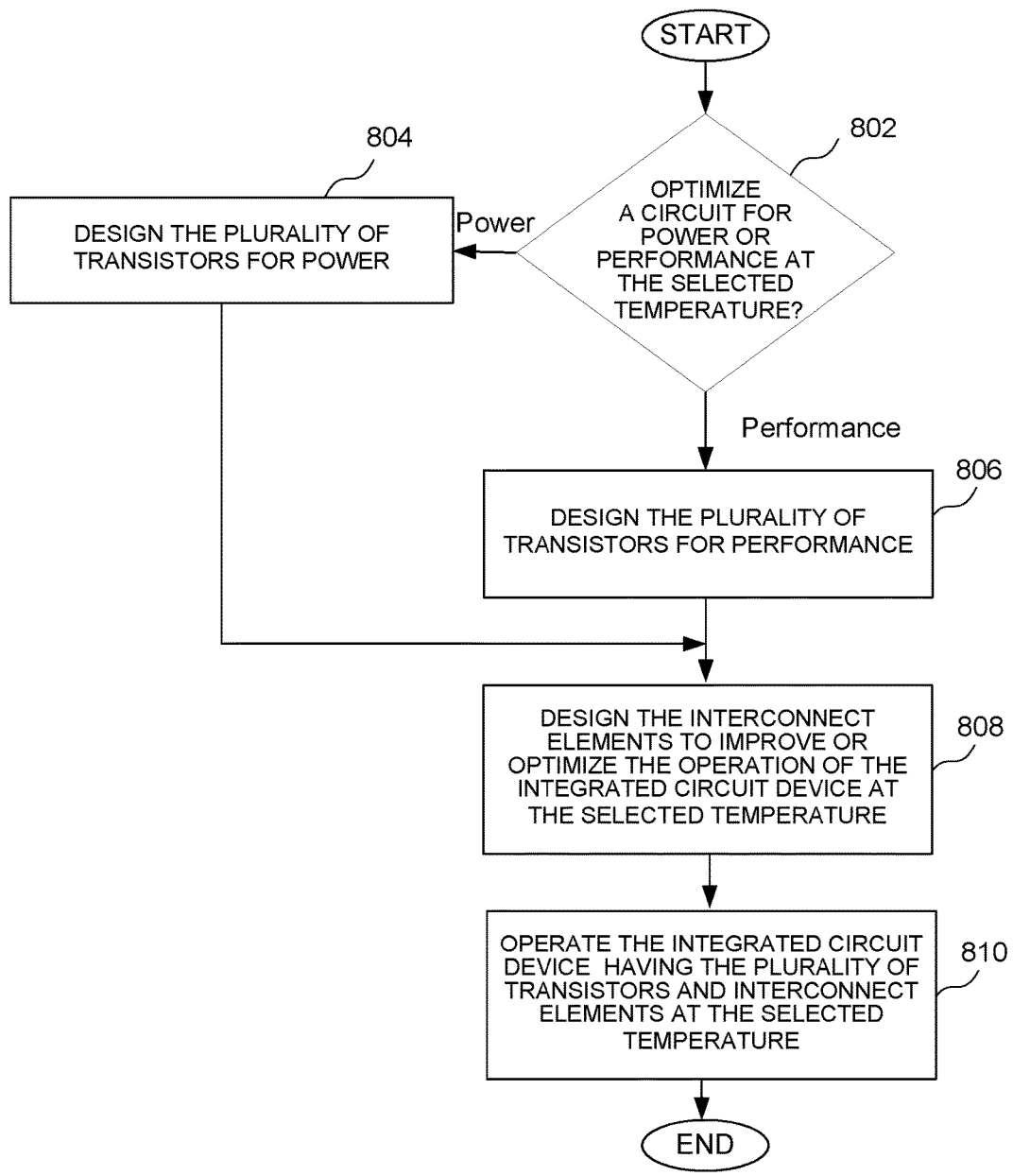
FIG. 8 is a flow chart showing another method of designing and producing an integrated circuit device.

Turning now to FIG. 8, a flow chart shows another method of producing an integrated circuit device. It is first determined whether it is desirable to optimize a circuit for power or performance at a block 802. If the circuit is to be optimized for power, the plurality of transistors is designed for power at a block 804. If the circuit is to be optimized for performance, the plurality of transistors is designed for performance at a block 806. The transistors can be optimized for power or performance as described above. The interconnect elements are then designed to improve or optimize the operation of the integrated circuit device at a block 808. The interconnect elements can be implemented to improve the operation of the integrated circuit device as described above. The integrated circuit device having the plurality of transistors and interconnect elements is operated at the selected temperature at a block 810.

The method of FIGS. 7 and 8 may be implemented using the circuits, methods and systems as described as described above, or using some other suitable circuits, methods and systems. While specific elements of the method are described, it should be understood that additional elements of the method, or additional details related to the elements, could be implemented according to the disclosure of the figures.

It can therefore be appreciated that new methods of designing and producing an integrated circuit have been described. It will be appreciated by those skilled in the art that numerous alternatives and equivalents will be seen to exist that incorporate the disclosed invention. As a result, the invention is not to be limited by the foregoing implementations, but only by the following claims.

What is claimed is:

1. A device comprising:
a circuit, comprising:
a plurality of transistors; and
interconnect elements coupled to the plurality of transistors, the interconnect elements enabling transfer of signals between the plurality of transistors; and
a cooling element implemented on the device, a circuit board of the device, or a system to retain one or more devices or circuit boards that include the device, the cooling element configured to maintain a temperature of the circuit below a predetermined temperature;
wherein one or more parameters of the circuit is optimized to operate at a temperature below the predetermined temperature.

2. The device of claim 1, wherein optimizing the one or more parameters of the circuit comprises designing the plurality of transistors for reduced power or increased performance.

3. The device of claim 1, wherein the cooling element comprises an active cooling element selected from a group consisting of an air cooling system, an immersion cooling system, a jet cooling system, and a closed-loop refrigerant system.

4. The device of claim 1, wherein optimizing one or more parameters of the circuit comprises selecting at least one of gate lengths, dielectric materials, threshold voltages, on currents, off currents, and doping profiles of the plurality of transistors.

5. The device of claim 4, wherein selecting at least one of gate lengths, dielectric materials, threshold voltages, on currents, off currents, and doping profiles of the plurality of transistors comprises selecting at least one of gate lengths, dielectric materials, threshold voltages, on currents, off currents, and doping profiles for increased performance.

6. The device of claim 4, wherein selecting at least one of gate lengths, dielectric materials, threshold voltages, on currents, off currents, and doping profiles of the plurality of transistors comprises selecting at least one of gate lengths, dielectric materials, threshold voltages, on currents, off currents, and doping profiles for reduced power.

7. The device of claim 1, wherein optimizing the one or more parameters of the circuit comprises selecting parameters of the interconnect elements.

8. The device of claim 7, wherein selecting parameters of the interconnect elements comprises selecting at least one of thinner metal layers, smaller dimensions, and lower resistance materials for the interconnect elements.

9. The device of claim 1, wherein the device comprises one of an integrated circuit device or a circuit board.

10. The device of claim 1, wherein the cooling element is adapted to maintain a die of a plurality of integrated circuit devices below the predetermined temperature.

11. A method of implementing a device, the method comprising:
identifying a predetermined temperature for operating a circuit of the device, the circuit including a plurality of transistors and interconnect elements;
selecting a cooling element for maintaining the circuit at a temperature below the predetermined temperature, implementing the cooling element on the device, a circuit board of the device, or a system to retain one or more devices or circuit boards that include the device;

optimizing one or more parameters of the circuit to operate at the temperature below the predetermined temperature; and coupling the interconnect elements to the plurality of transistors to enable transfer of signals between the plurality of transistors.

12. The method of claim 11, wherein optimizing the one or more parameters of the circuit comprises designing the plurality of transistors for reduced power or increased performance.

13. The method of claim 11, wherein the cooling element comprises an active cooling element selected from a group consisting of an air cooling system, an immersion cooling system, a jet cooling system, and a closed-loop refrigerant system.

14. The device of claim 11, wherein optimizing one or more parameters of the circuit comprises selecting at least one of gate lengths, dielectric materials, threshold voltages, on currents, off currents, and doping profiles of the plurality of transistors.

15. The device of claim 14, wherein selecting at least one of gate lengths, dielectric materials, threshold voltages, on currents, off currents, and doping profiles of the plurality of transistors comprises selecting at least one of gate lengths, dielectric materials, threshold voltages, on currents, off currents, and doping profiles for increased performance.

16. The device of claim 14, wherein selecting at least one of gate lengths, dielectric materials, threshold voltages, on currents, off currents, and doping profiles of the plurality of transistors comprises selecting at least one of gate lengths, dielectric materials, threshold voltages, on currents, off currents, and doping profiles for reduced power.

17. The method of claim 11, wherein optimizing one or more parameters of the circuit comprises selecting parameters of the interconnect elements.

18. The method of claim 11, wherein selecting parameters of the interconnect elements comprises selecting at least one of thinner metal layers, smaller dimensions, and lower resistance materials for the interconnect elements.

19. The method of claim 11, wherein the device comprises one of an integrated circuit device or a circuit board.

20. The method of claim 11, wherein the cooling element is adapted to maintain a die of a plurality of integrated circuit devices below the predetermined temperature.

* * * * *